United States Patent
Flint et al.

(10) Patent No.: US 6,504,917 B1
(45) Date of Patent: Jan. 7, 2003

(54) CALL PATH DISPLAY TELEPHONE SYSTEM AND METHOD

(75) Inventors: Ephraim Bemis Flint, Garrison; Lawrence Shungwei Mok, Brewster; Modest Michael Oprysko, Mahopac, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/301,932

(22) Filed: Apr. 29, 1999

(51) Int. Cl.[7] ............................................. H04M 11/00
(52) U.S. Cl. ................................. 379/93.01; 379/93.25
(58) Field of Search .......................... 379/93.17–93.19, 379/93.18, 93.25, 265.01, 266.02, 93.01

(56) References Cited

U.S. PATENT DOCUMENTS

| | | | |
|---|---|---|---|
| 5,608,788 A | | 3/1997 | Demlow et al. |
| 5,793,854 A | | 8/1998 | Kashepava |
| 5,832,059 A | * | 11/1998 | Aldred et al. ............ 379/127 X |
| 5,912,952 A | * | 6/1999 | Brendzel ................. 379/93.25 |
| 6,064,730 A | * | 5/2000 | Ginsberg .............. 379/93.17 X |
| 6,178,404 B1 | * | 1/2001 | Hambleton et al. .. 379/88.16 X |
| 6,272,216 B1 | * | 8/2001 | Vaios .................. 379/93.17 X |

FOREIGN PATENT DOCUMENTS

| | | |
|---|---|---|
| EP | 0608066 A2 | 1/1994 |
| EP | 0788269 A2 | 1/1997 |
| EP | 0858231 A2 | 1/1998 |
| WO | WO96/04741 | 2/1996 |

OTHER PUBLICATIONS

Armand Carmine, "Screen phones and ADSI: the first international communications service since the fax machine." Philips Telecommunication Review V.52, n.4 (Oct. 1995) pp. 25–29.

* cited by examiner

Primary Examiner—Creighton Smith
(74) Attorney, Agent, or Firm—Paul J. Otterstedt

(57) ABSTRACT

A call path display telephone system includes an establishment telephone and a user telephone. The establishment telephone includes a memory, communication module and controller. The user telephone includes a memory, microphone, speaker, keypad, communication module, controller, and a visual input/output module. The desired menu options for a call path are visually displayed to a user to allow the user to more rapidly and efficiently navigate through the call path menu. Unlike prior-art voice based systems, it is not necessary to sequentially listen to all available options; they can be rapidly viewed visually and selected as desired. A method of communicating call path menu data from an establishment to a user includes placing a telephone call from a user telephone of the user to an establishment telephone of the establishment, downloading the call path menu data from the establishment, visually displaying the call path menu data to the user, and then having the establishment accept a selection from the user in response to the visual display of the call path menu data.

46 Claims, 7 Drawing Sheets

CALL PATH DISPLAY TELEPHONE SYSTEM AND METHOD

BACKGROUND OF THE INVENTION

1. Field of the Invention

The present invention relates to telephony, and more particularly relates to a call path display telephone system and method.

2. Brief Description of the Prior Art

Currently, telephone users must frequently deal with the annoyance of the so-called "call path systems" which are used by businesses to reduce the cost of answering calls from their customers. The cost reduction comes at the expense of forcing the customer to wait through what is typically a long and confusing maze of options to be remembered. Accordingly, it would be highly desirable to develop a system and method which would enhance the user's interaction with the call path system. Such a system and method should make it faster and easier for the user to navigate through the various options.

In view of the foregoing, there is a need in the prior art for a call path system which presents information to the user visually so that the user can rapidly select from among the available options without having to listen to all available options and without having to remember the options.

SUMMARY OF THE INVENTION

The present invention, which addresses the needs identified in the prior art, provides a call path display telephone system for operation over a telephone network. The system includes an establishment telephone and a user telephone. The establishment telephone includes an establishment memory which stores quasi-permanent call path menu data providing a plurality of path options for a user of the system. The establishment telephone further includes an establishment communication module which receives input signals over the telephone network and which sends call path menu data signals, indicative of the quasi-permanent call path menu data, in response to the received input signals. The establishment telephone yet further includes an establishment controller which is coupled to the establishment memory and the establishment communication module and which controls operation of the establishment memory and establishment communication module.

The user telephone includes a user memory which stores downloaded call path menu data, a microphone which receives voice input from the user, a speaker which provides audible output to the user, and a keypad which receives alphanumeric input from the user. The user telephone further includes a user communication module which receives the call path menu data signals from the establishment communication module and which provides the call path menu data signals to the user memory in a form for storage as the downloaded call path menu data. Yet further, the user telephone includes a visual input/output module which visually displays the downloaded call path menu data to the user and which receives interactive input from the user in response to the visually displayed call path menu data. Yet further, the user telephone includes a user controller which is coupled to the user memory, the microphone, the speaker, the keypad, the user communication module and the visual input/output module and which controls operation thereof.

The invention includes the system together with one or more establishment telephone(s) and one or more user telephone(s), and the invention also includes the individual establishment telephone and the individual user telephone.

The present invention also provides a method of communicating call path menu data from an establishment to a user. The method includes the step of placing a telephone call from a user telephone of the user to an establishment telephone of the establishment. Further, the method includes the step of downloading the call path menu data from the establishment telephone into a user memory of the user telephone, in response to the telephone call. Yet further, the method includes the step of visually displaying the call path menu data to the user. Finally, the method includes the step of accepting, by the establishment, from the user, in response to the visual display of the call path menu data, a selection of a given call path item from the call path menu data.

These and other features and advantages of the present invention will be appreciated by reading the following specification, taken in conjunction with the accompanying drawings, and the scope of the invention will be set forth in the appended claims.

DETAILED DESCRIPTION OF THE INVENTION

Figure 2:
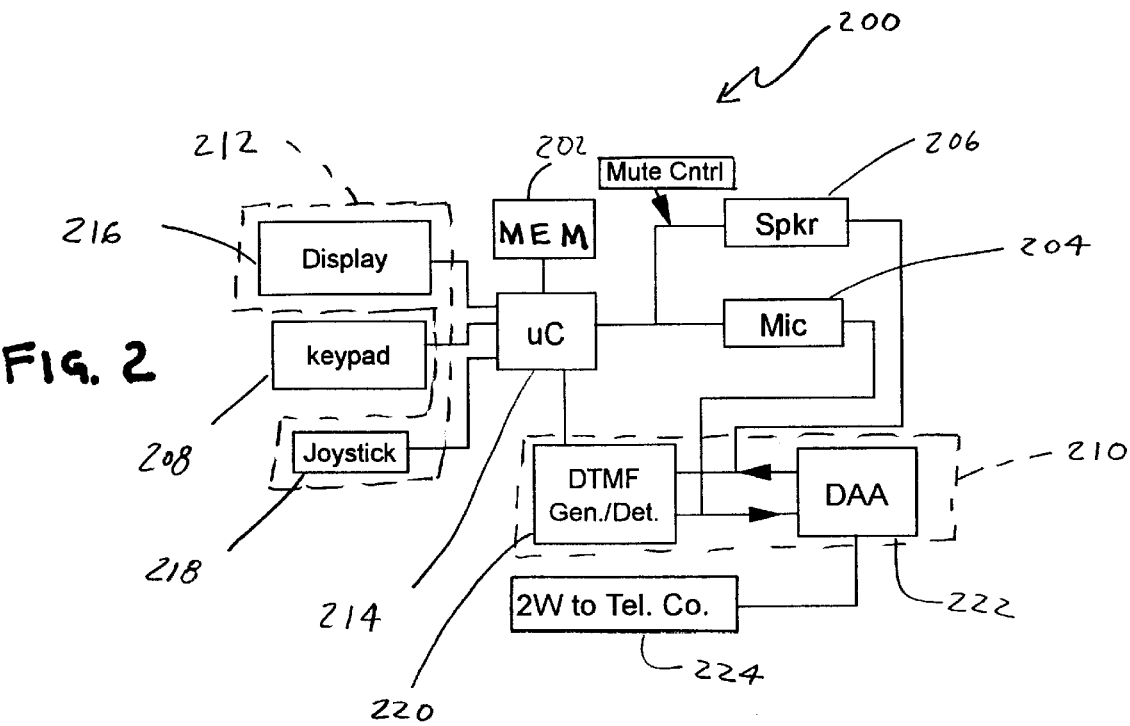
FIG. 2 is a block diagram of a first embodiment of a user telephone for a call path display telephone system in accordance with the present invention.
Figure 5:
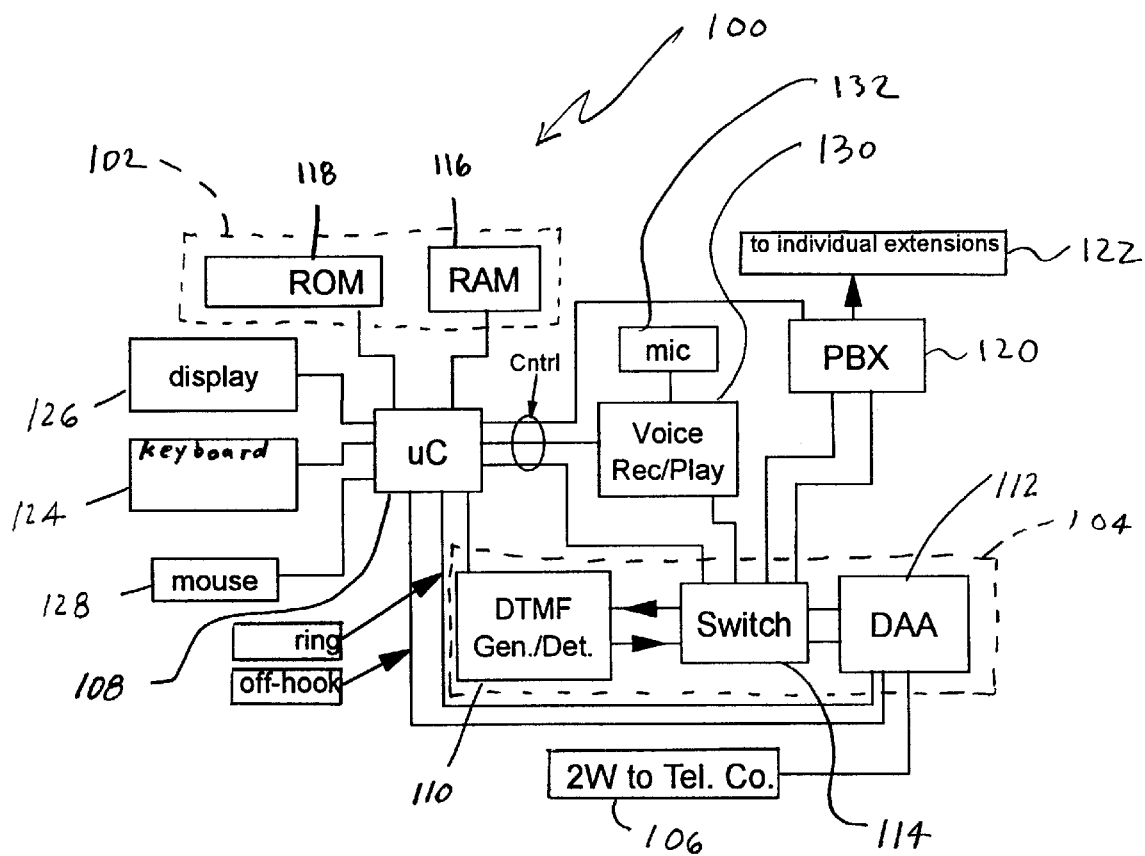
FIG. 5 is a block diagram of a first embodiment of an establishment telephone for use in a call path display telephone system of the present invention.

The system of the present invention will now be described with initial reference to FIGS. 2 and 5. The call path display telephone system of the present invention can operate over a conventional telephone network. The call path display telephone system includes an establishment telephone, designated generally as 100, and a user telephone, designated generally as 200. The establishment telephone 100 is shown in FIG. 5, while the user telephone 200 is shown in FIG. 2. Referring to FIG. 5, the establishment telephone includes an establishment memory 102 which stores quasi-permanent call path menu data providing a plurality of path options for a user of the system. Such path options will be discussed further below. The establishment telephone 100 further includes an establishment communication module 104 which receives input signals over the telephone network (represented as 106) and which sends call path menu data signals, which are indicative of the quasi-permanent call path menu data, in response to the input signals. The connection to the telephone network, exemplified by item 106, can be, for example, an ordinary two wire connection to the telephone company. The establishment telephone 100 yet further includes an establishment controller 108 which is coupled to the establishment memory 102 and to the establishment communication module 104 and which controls operation of the memory 102 and module 104.

The establishment communication module 104 and the establishment controller 108 can be configured so as to emit a call path display interrogation signal which interrogates the user telephone 200 in order to determine whether the user telephone is a call-path-display-enabled unit. The establishment memory 102 and the establishment controller 108 can be configured so as to recognize a set of predefined menu characters which correspond to standard call path options, for example, "sales" and "service" and the like.

The establishment communication module 104 can include an establishment dual-tone multi-frequency (DTMF) generator/detector 110 coupled to the establishment controller 108 and can also include an establishment data access arrangement (DAA) 112 which is coupled to the establishment DTMF generator/detector and which is configured for communication over the telephone network 106. A suitable switch 114 can be provided to interconnect the DTMF generator/detector 110 and DAA 112. The establishment controller 108 can be configured to operate in a voice plus DTMF response mode when the user telephone 200 has not been identified as a call-path-display-enabled unit. It is to be understood that the exemplary user telephone depicted in FIG. 2 and designated as item 200 is in fact such a call-path-display-enabled unit, in accordance with the present invention. However, the just-described configuration of the establishment controller 108 to operate in the voice plus DTMF response mode is provided for situations when conventional user telephones not having the capabilities of the present invention are encountered.

The establishment memory 102 can include an establishment random access memory (RAM) 116 and an establishment read-only memory (ROM) 118. The nonvolatile ROM 118 is provided for storing the call-path option tree (which may need to be updated from time to time) and programs which use input from the caller (i.e., the user) to determine the next action that the establishment telephone system must take. The ROM 118 can be provided in the form of an EEPROM. The establishment telephone 100 should also be part of, or connected to, the establishment's private branch exchange (PBX) 120. The switch 114, under the control of the processor 108, can provide a link into the PBX 120 such that an incoming call, which has navigated the call path tree to a given destination, can be routed to the appropriate extension (suggested by the box 122).

It is desirable that elements be made available to input the call path menu tree and to permit viewing and/or modification of same. Accordingly, an establishment keyboard 124, an establishment mouse 128 can be provided to interface with the establishment controller 108 to provide input of the call path tree, review of the call path tree and Possible modification of the call path tree.

As noted, it is desirable that the establishment telephone 100 should be compatible with user phones which are not call-path-display-enabled. Accordingly, it may be desirable to provide the establishment telephone 100 with,the capability to revert to ordinary voice-based call-path function to accommodate such user telephones. Accordingly, an establishment voice record and playback unit 130 and an establishment microphone 132 can be provided and can be interconnected with the establishment controller 108 and the switch 114 as shown.

Note that the "ring" and "off-hook" lines are provided for the corresponding standard control signals found in telephone equipment. The ring signal is detected by the DAA 112 and can produce either an audible ring, or-can be passed to the controller 108 as a logic signal. Thus, an alert of an incoming call is provided. The off-hook occurs under the action of the controller 108, with DAA 112 providing connection to the telephone company.

Establishment controller 108 can be a microprocessor or micro controller as shown in FIG. 5. However, it is to be understood that any suitable controller can be employed, for example, a general purpose computer such as a personal computer. Use of such a personal computer may be desirable in a telephone system which has other features, such as voice mail. In this case, the personal computer, when used as establishment controller 108, would be able to support all of the functions of the establishment's phone system.

Figure 6:
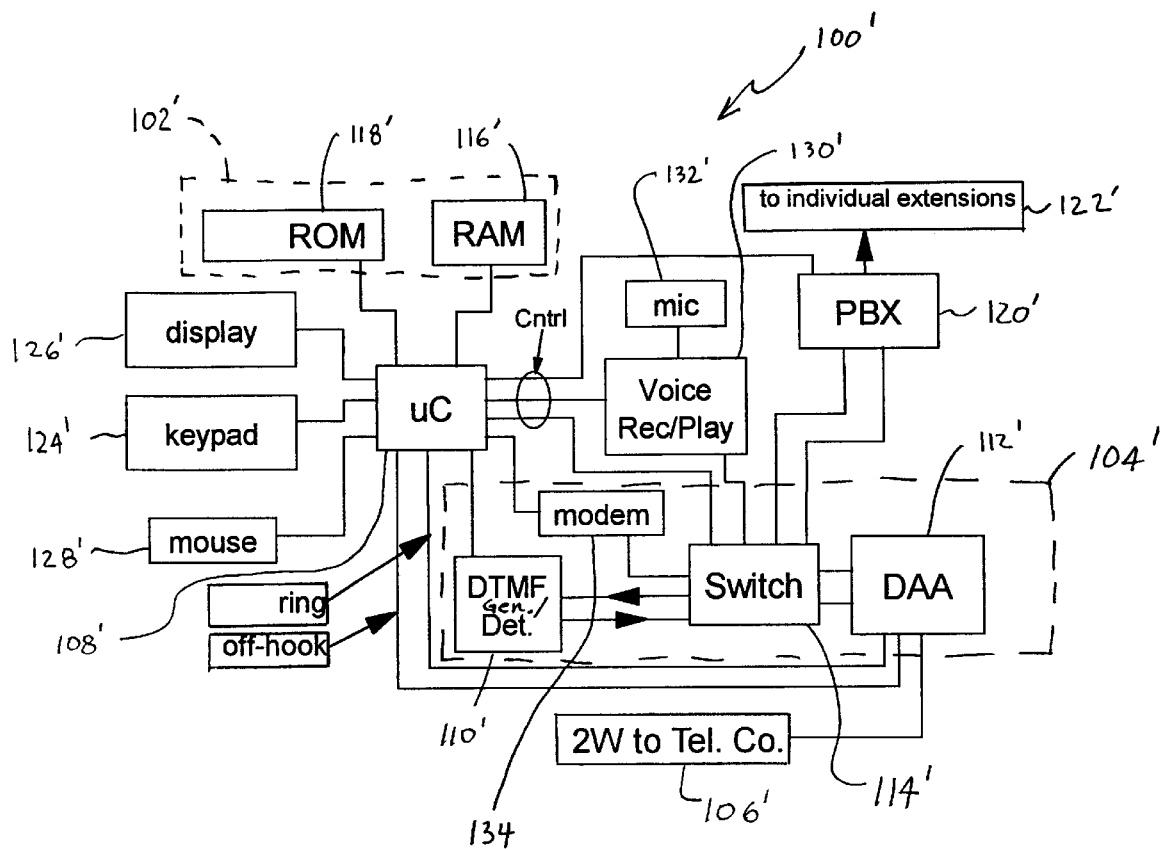
FIG. 6 is a block diagram of a second embodiment of an establishment telephone for use in a call path display telephone system of the present invention.

Reference should now be had to FIG. 6 which shows an alternative embodiment of establishment telephone 100' wherein items similar to those in FIG. 5 have received the same number followed by a "prime." Note that the legend "Cntrl" in FIGS. 5 and 6 indicates that the three encircled lines are control (as opposed to data) lines which interconnect the establishment controller 108, 108'with the PBX 120, 120'; record and playback unit 130, 130'; and switch 114, 114' respectively. In the alternative embodiment of establishment telephone 100' shown in FIG. 6, the establishment communication module 104' includes an establishment modem data pump 134 coupled to the establishment controller 108' and an establishment data access arrangement 112' which is coupled to the establishment modem data pump 134, for example, as shown in FIG. 6, and which is configured for communication over the telephone network represented by item 106'. Elements 112' and 134 can be connected, for example, through switch 114'. It will be appreciated that the telephones shown in FIGS. 5 and 6 are substantially similar, except for the addition of the establishment modem data pump 134 in FIG. 6. The generator of the DTMF generator/detector 110' is employed for normal telephone dialing, while the detector of the DTMF generator/detection 110' can be employed in those situations when a voice-based call path mode is used, due to the user telephone not being call-path-display-enabled. It should be understood that this feature could be omitted where it is only desired to communicate with call-path-display-enabled user telephones. The controller 108' and switch 114' permit transfer of data by the modem 134, until such time as the user has navigated his or her way through the call-path menu tree and has selected an action. At this point, the PBX 120' can ring the appropriate extension of the individual extensions 122' and the call can be switched through to the PBX 120'.

Figure 9:
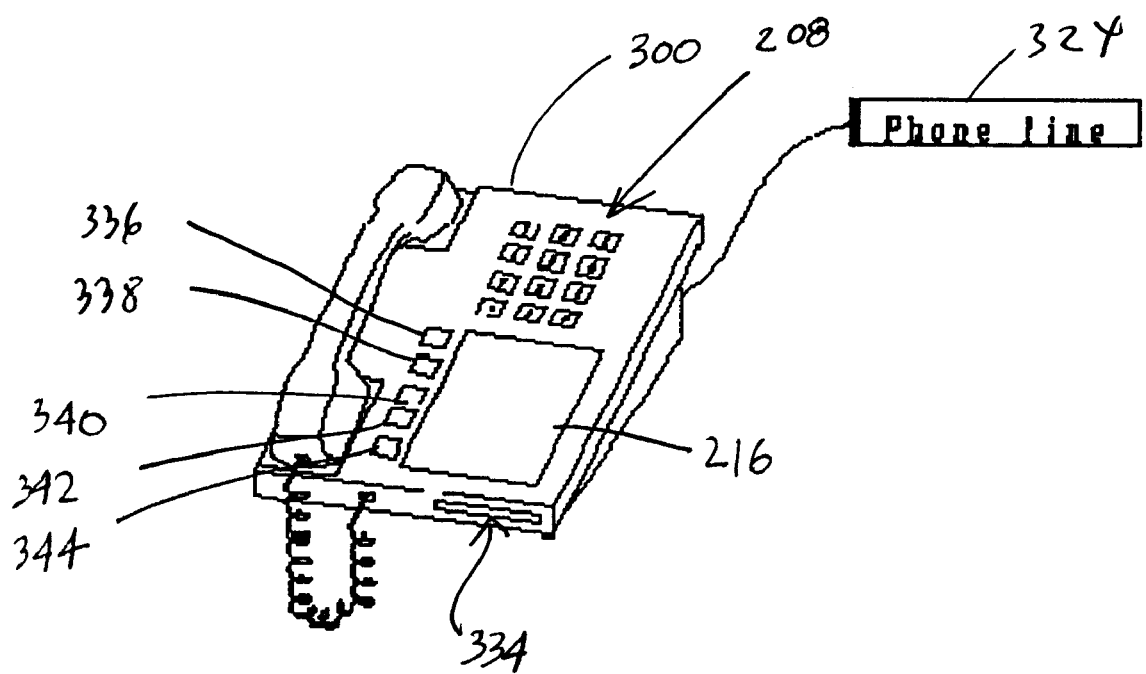
FIG. 9 is a pictorial view of a user telephone suitable for use in a call path display telephone system of the present invention.

Attention should now be given to FIG. 2 for a description of a user telephone in accordance with the present invention. The user telephone includes a user memory 202 which stores downloaded call path menu data received from the establishment telephone 100. The user telephone also includes a microphone 204 which receives voice input from a user. Further, the user telephone includes a user speaker 206 which provides audible output to the user. A user keypad 208 which receives alphanumeric input from the user is also provided. Keypad 208 is preferably a standard. telephone keypad formed integrally with the user telephone, as best seen in FIG. 9.

The user telephone 200 further includes a user communication module 210 which receives the call path menu data signals from the establishment communication module 104 and which provides the call path menu data signals to the user memory 202 in a form for storage as the downloaded call path menu data. The user telephone 200 yet further includes a visual input/output module 212 which visually displays the downloaded call path menu data and which receives interactive input from the user in response to the visually displayed call path menu data. Still further, the user telephone 200 includes a user controller 214 which is coupled to the user memory 202, the user microphone 204, the user speaker 206, the user keypad 208, the user communication module 210 and the visual input/output module 212 and which controls the operation thereof. The user memory 202 and user controller 214 can be configured to recognize a set of predefined menu characters as discussed above with respect to the establishment memory 102 and the establishment controller 108. It should be understood that the user controller 214 can be a microprocessor or micro controller as shown in FIG. 2, or can also be a general purpose computer such as a personal computer. It is envisioned that the user telephone 200 may not have as great a need for a general purpose computer as a controller, as compared to the controller 108 for the establishment telephone 100 discussed above, since the menu tree does not have to be maintained by the user telephone 200. However, any suitable type of controller for the user telephone 200 is within the scope of the present invention. A microprocessor or micro controller is believed preferable to permit the user telephone to assume the size and shape of an ordinary telephone unit.

The user communication module 210 and the user controller 214 can be configured to emit a call path display interrogation signal which interrogates the establishment telephone 100 to determine whether the establishment telephone 100 is in fact a call-path-display-enabled unit. It should be understood that the user telephone 200 may not always be communicating with a call-path-display-enabled unit such as establishment telephone 100, but may in fact be communicating with an establishment which has a conventional telephone or a conventional voice-actuated call path menu system (i.e., user telephone can function as an ordinary telephone). If desired, the user controller 214 and at least one of the user keypad 208 and user visual input/output module 212 can be configured to selectively enable and disable emission of the call path display interrogation signal. It should be appreciated that the call path display interrogation signal can be emitted by either the user telephone 200 or the establishment telephone 100. At present, it is believed that when this signal is emitted by the establishment telephone, it would normally be emitted at the beginning of all telephone calls. However, it is believed that it may be desirable, in cases when the user telephone is to emit the call path display interrogation signal, to provide the aforementioned capability for selectively disabling the emission of the signal.

As noted, an interrogation signal can be sent by either the user telephone or the establishment telephone. When the user telephone sends out the interrogation signal, this could be in the form of a tone or some other type of signal, preferably not too loud so as to cause distress to a user (or a human at the establishment end), in order to determine whether the establishment telephone has call path menu data capability. If the establishment telephone does in fact have such capability, it could respond to the interrogation signal by commencing downloading of the menu tree. When, instead, the establishment telephone initiates the interrogation, the user telephone could then be receptive to interrogation. The given establishment telephone with call path menu data capability could automatically send out an interrogation signal each time it received a call. As noted, the user telephone could be configured such that transmission of the interrogation signal could be selectively enabled or disabled. If desired, however, the user telephone could simply be configured to always transmit such an interrogation signal. Thus, to summarize, three options are envisioned: establishment telephone initiates interrogation for every call, user telephone initiates interrogation for every call, or user telephone selectively initiates interrogation. The latter option is believed preferable, since the user will only select when they anticipate a call-path-enabled system in the establishment. This avoids irritation of human listeners, or the need to put constraints on the interrogation signal.

Still with reference to FIG. 2, the user telephone 200 can be provided with a mute controller which is interconnected with the user speaker 206 and which selectively mutes the user speaker during reception of the call path menu data signals. The mute controller can be a part of the user controller 214, and, as such, is not amenable to further illustration. The line labeled "Mute Cntrl" can carry the mute control signal from the controller 214 to the speaker 206. The interrogation signal can be in the form of DTMF tone pairs, for example, two such pairs.

The user speaker 206 can be muted by the mute controller when tones which would have an annoying volume to the user are expected to be received. Some appropriate feedback could be given to the user to indicate that there has not been a malfunction with the telephone, for example, a further update of the menu or a blinking light can be provided so that the user knows that he or she has not been disconnected, or that some other problem with the telephone connection does not exist.

The user controller 214 can advantageously be configured to purge the user memory 202 of the downloaded call path menu data following completion of a given telephone call. The user visual input/output module 212 can include a user visual display 216 and a user cursor controller 218. The display 216 can be coupled to the user controller 214 and can visually display the downloaded call path menu data to the user. The cursor controller 218 can be coupled to the user controller 214 and can receive the interactive input from the user by permitting the user to place a cursor on and to select a desired call path menu option, and also to permit the user to scroll through the call path menu data. It should be noted that the cursor controller 218 is depicted in FIG. 2 as a joystick. However, any suitable cursor controller can be utilized, for example, arrow keys, a mouse, and the like.

It will be appreciated that the user telephone 200 depicted in FIG. 2 can be a typical DTMF phone to which has been added the visual input/output module 212, the memory 202, the controller 214 and the other features described above, such as the DTMF detector (portion of 220) or other means to detect incoming digital data, and the mute controller.

It is preferable that the visual display 216 be configured to display at least three lines of textual call path menu data. The user memory 202 can be, for example, random access memory (approximately 1 kilobyte) to store the downloaded call-path information. If desired, the visual display 216 can be configured so as to selectively display substantially all of the call path menu so as to provide the user with a substantially complete call path menu. Further discussion of the menu and menu tree structures will be set forth below. The capability of simultaneously, visually displaying all, or a large portion of the menu tree, rather than only a single option at one time, as in voice response systems, provides substantial advantages for the present invention ,including greater efficiency and user-friendliness.

The user communication module 210 can include a user DTMF generator/detector 220 and a user data access arrangement (DAA) 222. The user DTMF generator/detector 220 can be coupled to the user controller 214, and the user DAA-222 can be coupled to the user DTMF generator/detector 220, and can be configured for communication over the telephone network represented by element 224. Any suitable interconnection with the telephone network, such as a standard two wire connection as shown in FIG. 2, can be employed.

Figure 3:
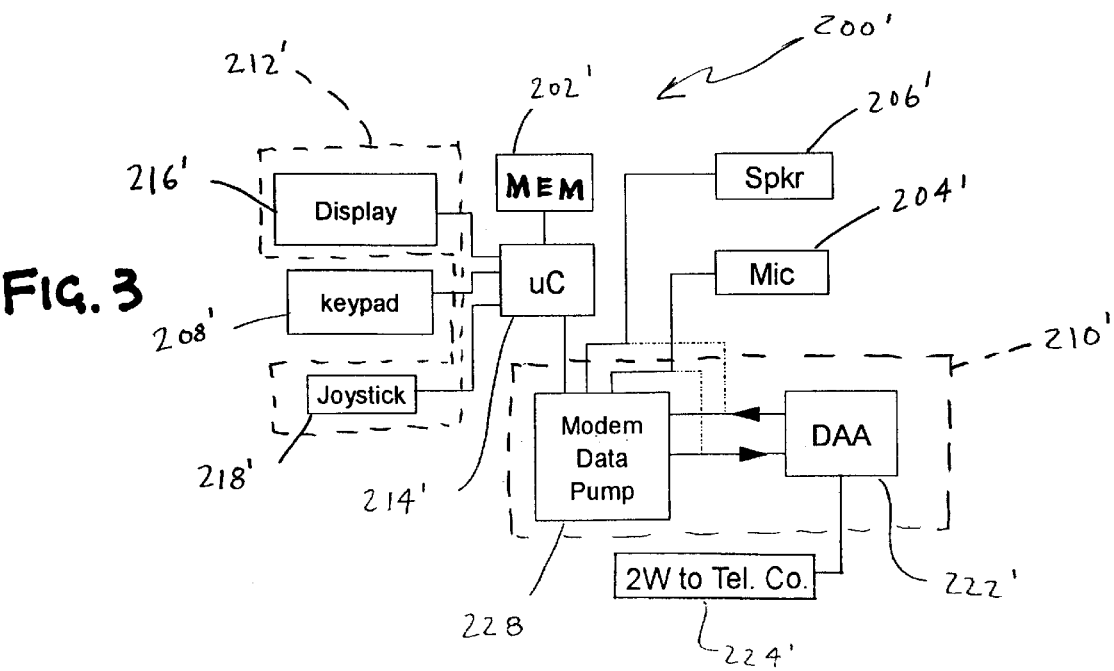
FIG. 3 is a block diagram of a second embodiment of a user telephone for a call path display telephone system in accordance with the present invention.

Reference should now be had to FIG. 3 which depicts an alternative embodiment of user telephone, designated as 200', in accordance with the present invention. Elements in FIG. 3 which are similar to elements in FIG. 2 have received the same reference character, followed by a prime. In the embodiment shown in FIG. 3, the user communication module 210' includes user data access arrangement 222' and a user modem data pump 228. The user modem data pump is coupled to the user controller 214, and the user data access arrangement is coupled to the user modem data pump 228 and is configured for communication over the telephone network 224'. The user speaker 206' and user microphone 204' are selectively coupled to the user modem data pump 228 in a call path mode and are selectively coupled to the user data access arrangement 222' in a conventional mode. The alternative embodiment of user telephone 200' shown in FIG. 3 can be used with the alternative embodiment of establishment telephone 100' shown in FIG. 6.

The first embodiment of user telephone 200 and the first embodiment of establishment telephone 100 encode and download the call path menu data using the DTMF tone standards. As set forth above, in the user telephone 200, the keypad 208, DTMF tone generator (portion of 220), speaker 206, microphone 204, and data access arrangement 222 are elements of existing phones. The visual display 216, controller 214, memory 202, cursor controller 218 and DTMF detector (portion of 220) can be added to an existing telephone design in order to support the display function of the present invention. Some prior art telephones have memories and possibly controllers (e.g., for speed dial and phone list features) but these components are not structured to perform the same functions as are those in the present invention.

In order to estimate the response time of a call path display telephone system employing the user telephone 200 and establishment telephone 100, some assumptions can be made about the call-path menu. If the data is sent using characters which are encoded as one byte per character and the modulation is through the use of the DTMF standard, there are sixteen DTMF pairs so that sending a DTMF tone can represent four bits and thus two DTMF's are required for a character. The fastest DTMF decode rate supported at the present time is 80 ms per tone pair which translates to 6.25 characters per second (somewhat greater speeds may be possible in the future). Thus, a display line reading "service" would require seven characters plus control characters, for a total of perhaps 10 characters. For the sake of argument, it can be assumed that the typical line requires ten to twenty characters. It would thus require 2 to 3 seconds to download each line. Selecting a menu item using the cursor controller 218 could immediately commence the: download of that segment, or of the next lower branch in the decision tree, as will be discussed below. Further, as the user navigates through the menu, the downloads continue on the currently selected tier; again, this will be discussed below. As in current voice-based systems, the user only needs to view that part of the call-path information that is of interest. However, with the display system it is possible to go back to the higher levels of the decision tree without having to listen to the entire path again from the start, and it is also possible for the caller to look at the entire option list at once (i.e., once it has been downloaded). More rapid detection of the DTMF pairs would enable the system to download the call path data more quickly. In this case, the entire menu tree could be downloaded before the user did any substantial amount of navigating through the menu tree. At present, this option might be annoyingly slow. It may be more attractive with future, faster systems.

As noted above, in a bandwidth limited system, such as current telephone systems, it may be desirable to predefine a number of standard options associated with most or all menu trees, for example, sales, service, and the like. Such a standard set of menu characters can be pre-stored in nonvolatile memory, for example, a nonvolatile portion of memory 202 (or the ROM 118, in the case of the establishment telephone 100). The pre-stored menu characters can now be encoded using much shorter character codes. For example, you could have a special prefix character followed by a keyword which would cut down on the amount of data-which had to be transmitted. Again, by way of example, you could have p32 different code words with a special prefix to indicate that a code word was to follow. The special prefix could be a double pound sign "##" followed by a two digit number identifying the given code. As noted, both user and establishment telephones would require a nonvolatile memory in this case. The predefined codes would be part of a permanently stored application program in the device and the controllers 108, 214 would be set up to send or display the call path information based on the predefined codes. Since the amount of data to be transmitted would be reduced, downloading time would be speeded up in this case. In view of the foregoing discussion, it will be appreciated that the memory 202, 202' can include both RAM and ROM.

Attention will now return to the alternative embodiment of user telephone 200', shown in FIG. 3 and the alternative embodiment of establishment telephone 100', shown in FIG. 6. For both the user and establishment phones in this embodiment, modems such as standard V.34 modems, for example, could be employed for encoding the data. Furthermore, additional support could be provided for digital simultaneous voice and data (DSVD). The hardware required for the alternative embodiment is somewhat more expensive and the caller must wait for the modems to negotiate a link, a process which typically takes on the order of 20 seconds. However, the second embodiment is advantageous in that there is now full time voice and data communications. This would allow an additional mode for input into the system. For example, if the call path menu tree supported the establishment's internal telephone directory, it could query the user for a name. The user could respond, for example, "Smith" and at the establishment "Smith" would be recognized. Thereafter, all the Smiths and their telephone numbers could be downloaded to the visual display 216' of the user telephone 200'. Similarly, a call to an establishment to inquire about the status of an order might involve the establishment end asking the customer for their name and address. The response could be spoken and the speech could be interpreted and then echoed back to the user visual display 216 so that the user would know if the information was accurately understood. The user telephone 200 could be configured so that moving the cursor, via cursor controller 214, to a line on the visual input/output module 212 which had an error, would permit a retry. A mouse or other device with clicking capability could be used for cursor control in this case. The foregoing features would be more user friendly-than the synthesized speech which is typically returned upon entry of numeric data on the keypad in current voice response call path menu systems. With regard to the alternative user telephone 200', as noted, during normal telephone use, when a call path display communication is not expected, ordinary voice communications can bypass the modem data pump 228. During call path enabled calls, both voice traffic and call-path data could be handled by the DSVD capabilities of the modem 228.

A back level modem standard, such as V.32, could be employed to save costs. Such a system would not support simultaneous voice and data but could still improve the download time for the call path menu data relative to a DTMF signaling scheme. Various proprietary modulation and signaling schemes could be employed within the scope of the present invention. For example, a codec can be employed. It is believed that the DTMF and modem data pump embodiments discussed herein are desirable given the present state of the art in telephony. However, in the future, there may be higher bandwidth "pipes" available to the home which could be segmented for voice and data. For example, a single digital stream which was duplexed might be employed. The present invention could be adapted to such future conditions. However, the embodiments described herein are believed preferable for present telephony applications with limited bandwidth, on the order of approximately 3 kHz.

It should be noted that as used herein, the word "establishment" is intended to include businesses, government offices, public interest agencies and the like, namely, any kind of institution which is likely to receive a large number of calls requiring handling with a call path menu data system.

Figure 4:
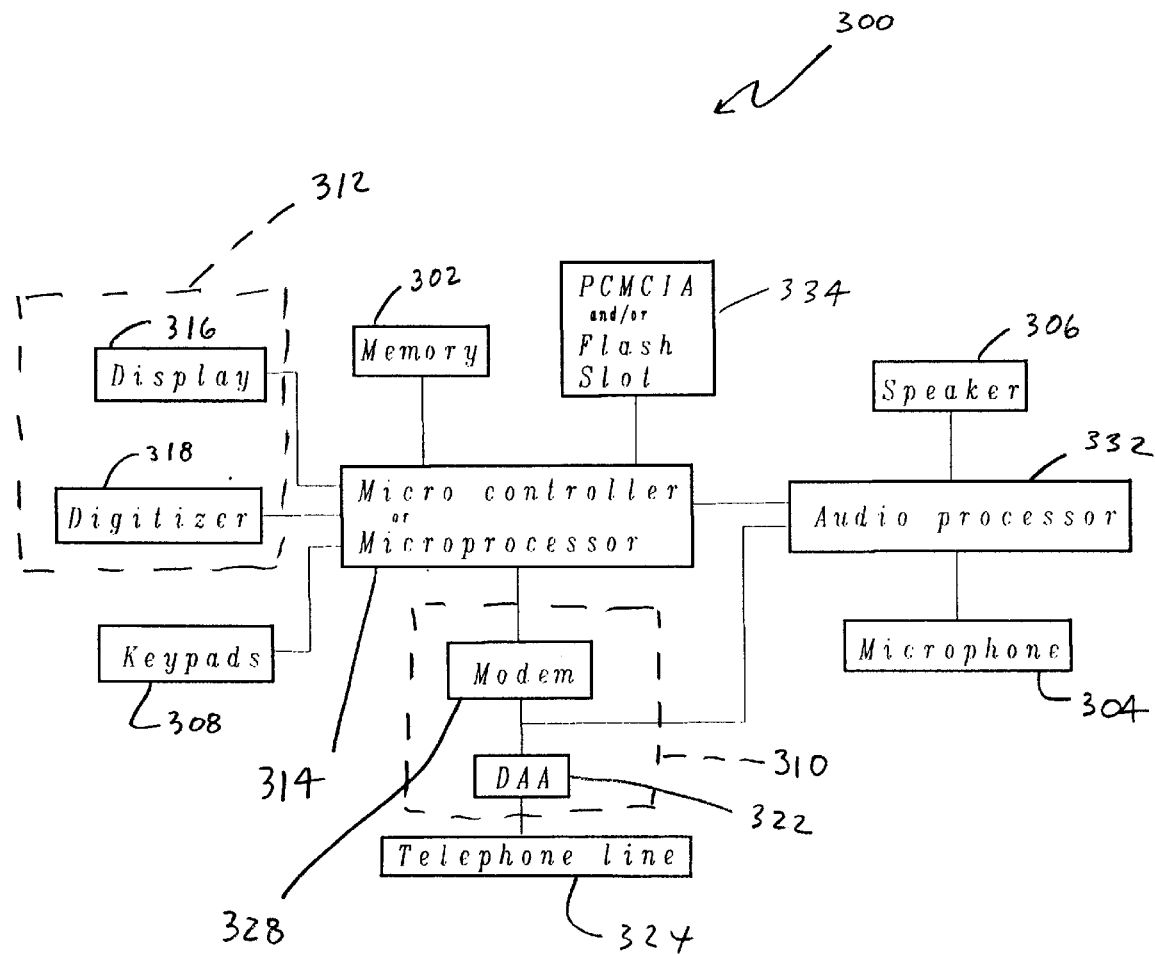
FIG. 4 is a block diagram similar to FIGS. 2 and 3, showing a third embodiment of user telephone having enhanced capabilities.

Attention should now be given to FIG. 4, which depicts an alternative embodiment of user telephone 300, in accordance with the present invention, having enhanced functionality as compared to the embodiments previously described herein. Elements similar to those already discussed with respect to FIGS. 2 and 3 have received the same reference character incremented by 100 and without any prime. As compared to the above-described user telephones 200, 200', the enhanced function user telephone 300 further includes an audio processor 332 and an interface region 334. The interface region 334 can be provided for receipt of a flash memory, a PCMCIA-format card or something similar. The audio processor 332 is coupled to the user controller 314, the speaker 306 and the microphone 304 and is configured for speech synthesis output through the speaker 306 and/or speech recognition input through the microphone 304. The user communication module 310 includes a user modem 328 and a user data access arrangement 322 which is coupled to the user modem 328 and which is configured for communication over the telephone network represented by element 324. The visual input/out module 312 can include a visual display 316 similar to those described above and can also include a digitizer 318. The digitizer can be coupled to the user controller 314 and can receive interactive input from the user. For example, such input could be in the form, at least in part, of handwriting capture. The interface region 334 which receives the flash memory and/or PMCIA card can be coupled to the user controller 314.

Although the digitizer 318 has received the number of the cursor controller incremented by one hundred, it should be understood that cursor control could instead be provided by one of the keypads 308 and the digitizer 318 could be limited to handwriting input and the like. The arrangement shown in FIG. 4 is particularly adapted for use with an analog telephone line 324 connected through the DAA 322. However, with suitable interface circuitry, digital telephone connections such as ISDN and HDSL could be employed. As shown in FIG. 4, the analog telephone line 324 is connected to the audio processor 332 through the DAA 322 for voice data and is connected to the modem 328 for DTMF and non-voice data signals. Digital data signals can be recovered by the modem 328 and fed to the controller 314, which can be a micro controller or microprocessor, for example. The microprocessor can process the data according to a program stored in the memory 302 and can also be programmed to handle the input signals from the keypads 308, digitizer 318, and the audio processor 332 via voice recognition technology. The microprocessor can also be programmed to perform text-speech synthesizing in conjunction with the audio processor 332. Text and graphics can be shown on the display 316, which can be, for example, a liquid crystal type.

As noted, the interface region 334 can be provided for receipt of a flash memory or PCMCIA card. It is envisioned that a primary purpose of interface region 334 will be to receive a flash memory card, whether PCMCIA or some other format. Other types of functions could be provided, whether in PCMCIA or other format. These include an SRAM memory card with built-in battery back-ups, a hard disk drive, an input/output port, and the like. Available functionality of PCMCIA cards is known to those skilled in the arts of computers and telecommunications. Region 334 thus permits memory expansion and/or the transfer of data between the telephone and another device, such as a "palm top" computer, in either direction.

Other options for the enhanced function user telephone 300 could include touch input through the input/output module 312, in addition to handwriting input, as well as the aforementioned voice command recognition. Voice command dialing from an extended telephone directory could also be supported, as could the sending or receiving of pen input, such as a sketch, to a similarly equipped phone. Thus, it will be appreciated that features similar to those shown in FIG. 4 could be added to an establishment telephone as well.

It will be appreciated that the present invention includes the telephone system with establishment telephone and user telephone communicating over a telephone network; includes the establishment telephone by itself; and includes the user telephone by itself.

Other embodiments of user telephone could be employed. For example, a suitable user telephone could be implemented on a personal computer with a modem, having a suitable speaker and a microphone. Telephone calls could be placed through the keyboard of the computer and the computer display could display the call path data. Furthermore, with regard to the establishment telephone, it should be noted that the establishment telephone need not necessarily have a display, although a display is highly desirable. However, in order to implement the visual aspect of the present invention, namely, visually displaying the call path menu tree, the user telephone must have a display of some type. The establishment telephone of the present invention sends call path menu data in the form of digital data which can be displayed on the display of the user telephone. Establishment telephones in current call path menu systems send call path menu data signals in the form of a recorded voice, which has the inconvenient attributes discussed above. It is presently believed that the preferred form of the present invention comprises establishment and user telephones which are essentially in the form of standard telephone units with the added components discussed herein, communicating over a public switched telephone network in an ordinary connection-oriented fashion.

Figure 7:
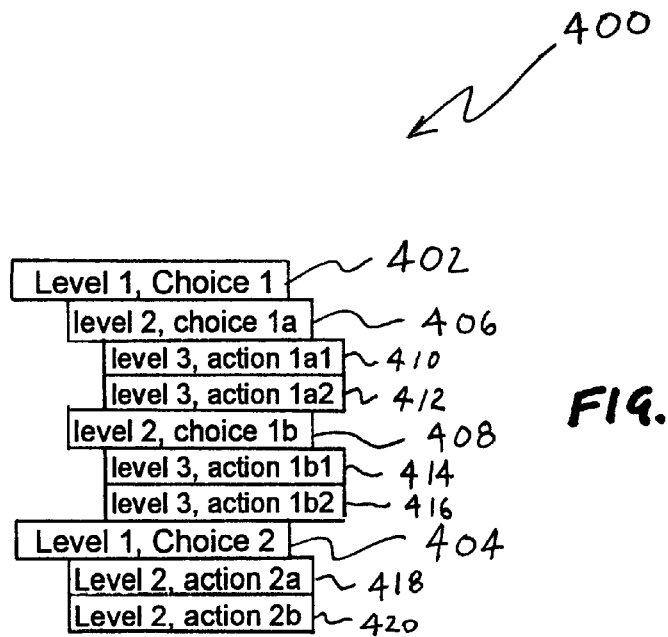
FIG. 7 is a view of a generic call path menu tree in accordance with the present invention.
Figure 8:
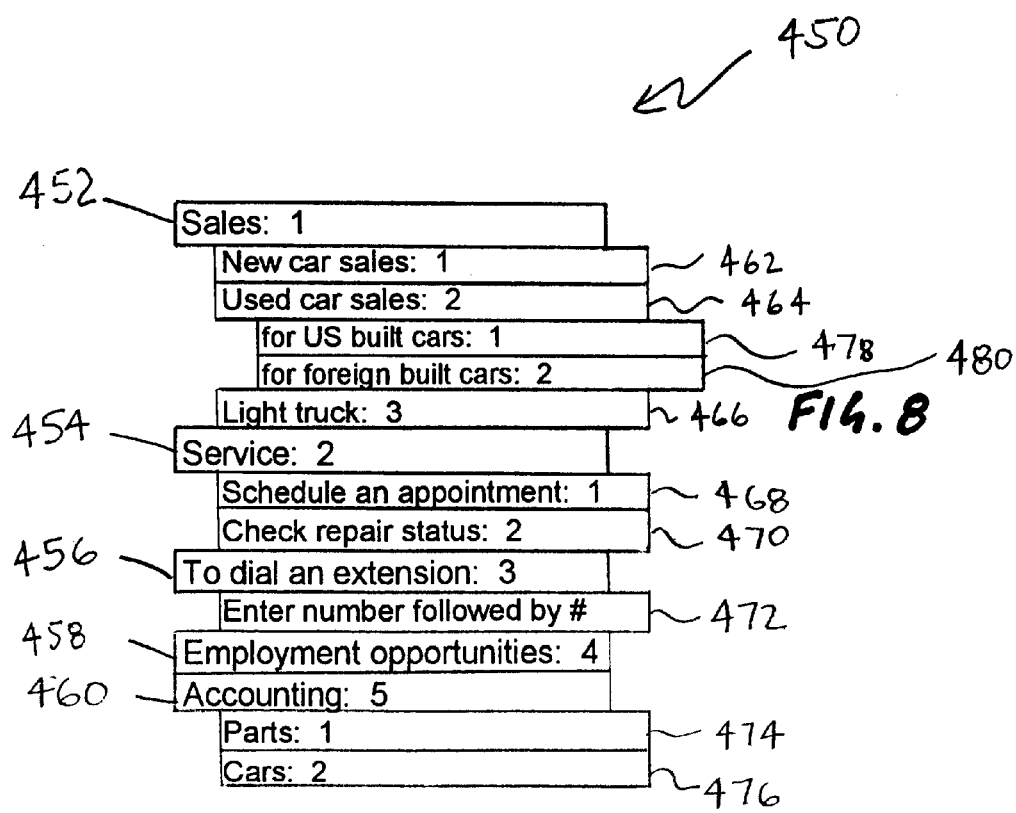
FIG. 8 is a view of a specific, exemplary call path menu tree in accordance with the present invention.

Reference should now be had to FIGS. 7 and 8 for a description of the call path menu data tree as used in accordance with the present invention. Certain terms will now be defined. A level refers to a given vertical location within the call path menu hierarchy. A call path menu item refers to an individual choice or action; there is one menu item per block in FIGS. 7 and 8. A branch refers to one or more of the menu items, each of which is at the same level, which menu item or items correlate to a menu item at the next highest level in the tree. However, the top level of the tree forms a single branch, as there is no next highest level. Correlating to a given menu item at the next highest level means that menu items in a branch logically fall under, or are associated with, the given menu item at the next higher level. That is, they are choices or actions which are related to the menu item at the next higher level. A selection refers to a user's choice of an item from the call path menu data. Finally, an action refers to a menu item which is an end result and does not have any other menu items beneath it.

Reference should be had first to FIG. 7, which depicts a generic call path menu data tree. The tree is designated generally as 400. The call path menu data in the tree 400 is representative of a call path menu having a plurality of branches and a plurality of levels. The first branch corresponds to level 1, choice 1 and level 1, choice 2, represented as blocks 402 and 404. Each branch and each level have at least one menu item; in this case, the first branch has two menu items, blocks 402 and 404. Each block is a menu item. A first one of the branches corresponds to a top one of the levels (here, level 1). Additional branches correspond to at least one menu item at a given one of the levels other than the top level, which in turn correlate to a menu item at the next highest level. For example, a second branch includes level 2 choices 1*a* and 1*b* (blocks 406 and 408) while a third branch includes level 2, action 2*a* and level 2, action 2*b* as represented by blocks 418 and 420. The branch represented by blocks 406 and 408 in turn leads to fourth and fifth branches, the fourth branch corresponding to level 3, action 1*a*1 and level 3 action 1*a*2, blocks 410 and 412; and the fifth branch, corresponding to level 3, action 1*b*1 and level 3, action 1*b*2, blocks 414 and 416. Further discussions of loading of the menu tree into the memory of the user telephone and navigating through the menu tree will be set forth below.

Attention should now be given to FIG. 8 for an exemplary call path menu data tree associated with a car dealership. The exemplary tree is designated generally as 450. It is to be emphasized that FIG. 8 is presented only by way of illustration and the present invention has applicability to many types of establishments besides car dealers.

The exemplary car dealer tree 450 includes a first branch which includes the top level: sales 452, service 454, dialing of an extension 456, employment opportunities 458 and accounting 460. Other branches include a second branch for new car sales 462, used car sales 464 and light truck sales 466, at the next lowest level, and correlating to sales 452; a third branch includes the schedule and appointment block 468 and the check repair status block 470 (correlating to service 454). A fourth branch includes the entering of a number block 472 and a fifth branch includes the parts block 474 and cars block 476. A sixth branch includes the US built car block 478 and the foreign built car block 480. The actions are blocks 462, 478, 480, 466, 468, 470, 472, 458, 474 and 476.

A method of communicating call path menu data from an establishment to a user, in accordance with the present invention, will now be described. The method includes the step of placing of a telephone call, from a user telephone 200, 200', 300 of a user to an establishment telephone 100, 100' of an establishment. The method further includes the step of downloading the call path menu data, such as that depicted in FIGS. 7 and 8, into the user memory 202, 202', 302 of the user telephone, in response to the telephone call which was placed. Further, the method includes the step of visually displaying the call path menu data to the user, for example, via the visual input/output module 212, 212', 312. Finally, the method includes accepting, by the establishment, and from the user, in response to the visual display of the call path menu data, a selection of a given call path item from the call path menu data. As will be discussed more fully below, such an item could be one of the choices discussed with respect to FIGS. 7 and 8.

The method can preferably include the additional step of selectively enabling the user telephone 200, 200', 300 to emit a call path display interrogation signal so as to verify call path display status of the establishment telephone 100, 100' as discussed above. Furthermore, the method can preferably include the additional step of purging the downloaded call path menu data from the user memory 202, 202', 302 after completion of the telephone call.

In one embodiment of the method, the downloading step can include downloading enough of the call path menu data such that the downloaded call path menu data in the user memory 202, 202', 302 corresponds to a substantially complete call path menu. In this case, the step of visually displaying can include displaying the substantially complete call path menu to the user. If desired, substantially all portions of the menu can be displayed to the user substantially simultaneously. In this case, the visual display 216, 216', 316 must be sufficiently large to show the whole menu. Alternatively, the whole menu need not be displayed to the user simultaneously; portions of the menu can be selectively displayed to the user in response to interaction with the user, for example, scrolling through the menu using the cursor controller 218, 218'. Thus, all of the data can be loaded in memory and a portion or all of the data can be displayed on the screen. Further, the substantially complete call path menu can be displayed to the user simultaneously, or in portions. As used herein, when it is mentioned that portions of a substantially complete menu are displayed, it is meant that the substantially complete menu is loaded in memory and can be readily accessed by simply scrolling. This is to be distinguished from the case where only a portion of the menu is loaded in memory and further downloading is required to view other portions of the menu.

The call path menu data will typically include a plurality of menu items, corresponding to the blocks 402–420 and 452–476 as discussed above with respect to FIGS. 7 and 8. The method can include the additional step of displaying each one of the items to the user as it is downloaded in the downloading step. In the displaying step, it is possible that only items at a given level will be displayed to the user. For example, only the top-level items of the call path menu data corresponding to blocks 402 and 404 in FIG. 7 or blocks 452, 454, 456, 458 and 460 in FIG. 8 could be displayed to the user at one time. Further, display of these items could be deferred until downloading is complete so as to implicitly advise the user of completion of the downloading step. Yet further, the user could be advised of the progress of the downloading step during downloading, for example, by showing a suitable message or an icon, or by displaying each item as it is downloaded.

The downloading step, as noted, can include downloading only a first level of the call path menu data. In this case (currently believed to be preferable), the method can comprise an additional step of downloading a second level of call path menu data, subsequent to the step of accepting the selection from the user, and in response to the user's selection of the given call path item. For example, with reference to FIG. 8, sales 452, service 454, dial an extension 456, employment opportunities 458 and accounting 460 could be the initial level that was displayed. If the user selected sales 452, an additional level of call path menu data including new car sales 462, used car sales 464, and light truck sales 466 could then be downloaded and displayed (and downloading of remaining top level items 454, 456, 458, 460 could be delayed. With reference to FIG. 8, it should be noted that the numerals following the various options, for example 1 following sales, 4 following employment opportunities, correspond to numbers which would have to be depressed on a telephone keypad in a conventional voice-based call path menu system.

As noted, the step of accepting the selection from the user can be accomplished by having the user scroll through the call path menu data to make the selection using the cursor controller 214, 214'. The step of displaying the call path menu data can include displaying at least three lines of textual data. Where only three lines are used, it may not be possible to display the entire menu at once, so that scrolling through the menu as described above may be necessary. Three lines is believed to be a preferred minimum (more than three lines would be desirable but more lines could drive up the cost); however, in principle even a one- or two-line display could be used, in combination with suitable reference line numbers (if desired).

The downloading step of the method can include downloading via DTMF tones, in response to the telephone call, and the step of accepting the selection can also be accomplished via DTMF tones. Use of DTMF tones in the method would correspond to use of user telephone 200 and establishment telephone 100 discussed above.

Alternatively, downloading of the call path menu data can be accomplished via a user modem data pump 228 and an establishment modem data pump 134 as discussed above, and the step of accepting a selection from the user can be accomplished via the user modem data pump and establishment modem data pump. This method would correspond to the establishment telephone 100' and user telephone 200' as discussed above.

Regarding the interrogation process, the method can preferably include the additional step of emitting a call; path display interrogation signal from the user telephone so as to verify that the establishment telephone is call-path-display-enabled. Most preferably, emission of this signal from the user telephone is selectively controlled by the user to minimize annoyance (no signal need be sent for an ordinary voice call). Alternatively, the method can include the additional step of emitting such an interrogation signal from the establishment telephone so as to verify that the user telephone is call-path-display-enabled. In the method, whenever tones are sent between the user telephone and the establishment telephone, in either direction, the speaker 206 of the user telephone can be muted using the mute control 226 discussed above, for example.

Appropriate additional steps can be added to the method when the enhanced function user telephone 300 discussed above is employed. For example, the additional step of supporting spoken interaction between the user and the establishment, in response to the accepting of the selection, can be added to the method.

In one embodiment of the method, the call path menu data can be representative of a call path menu having a treelike structure as discussed above with respect to FIGS. 7 and 8. In this case, the downloading step could include sequentially downloading individual ones of the menu items in a given one of the branches until either the downloading was complete or the user had made a selection of a given one of the call path items. For example, with respect to FIG. 8, the individual items 452, 454, 456, 458, 460 could be sequentially downloaded. Downloading could stop when all five of the items were downloaded, or when a given one of the items had been selected. In this form of the method, additional steps can include determining whether the selection of the given call path item requires action and, if so, taking the action if it is required. Further, an additional step can include displaying options associated with the selection. The aforementioned steps of downloading, displaying, accepting a selection from the user, determining whether the selection requires action, taking the action, and displaying options, can be repeated for another given one of the branches which correlates to the call path menu item previously selected.

Figure 1:
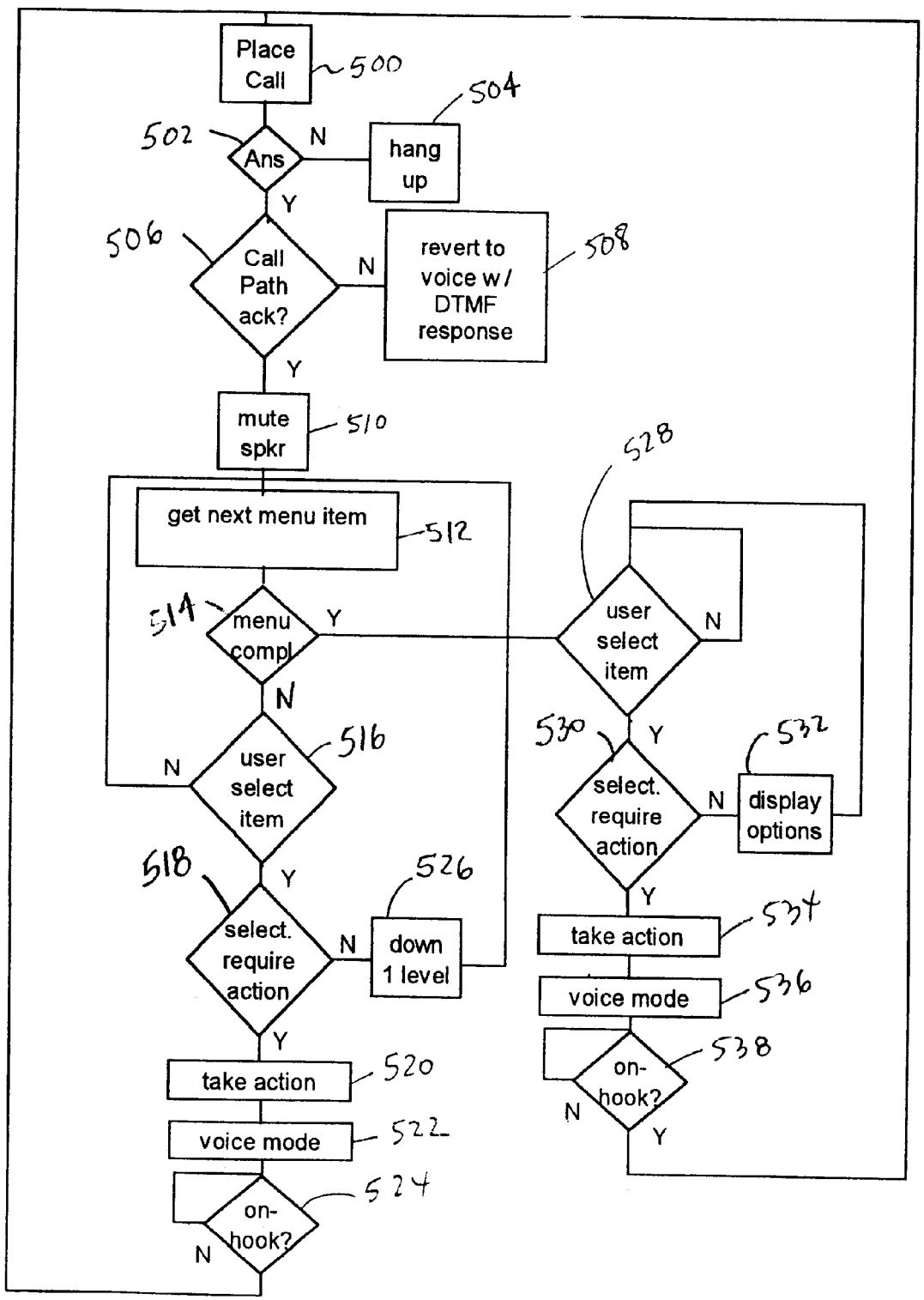
FIG. 1 is a flow chart of a method of communicating call path menu data in accordance with the present invention.

The foregoing method steps will be further illustrated with respect to FIGS. 7, 8 and 1. With reference to FIG. 8, suppose that block 456 has been selected, either as it shows up on the display, or after completion of downloading of all five of the top level items. An action is required in response to this selection, namely, the user must be prompted to enter the number followed by the pound sign, as shown in block 472. Thus, since it has been determined that selection of block 456 requires action, the appropriate action is taken. If all items at a first level have been downloaded and the user has selected an item which does not require action, options associated wit h the selection can be downloaded (as required) and displayed. For example, if the service block 454 were selected instead of the dial an extension block 456, no action would be required, instead, the options of scheduling an appointment 468 or checking repair status 470 would be displayed. The steps just described can be repeated for a given sub branch. For example, in the sub-branch including blocks 462, 464 and 466, if used car sales, block 464, were selected options associated with the selection, namely, US cars, block 478, or foreign built cars, block 480, could be displayed. Alternatively, if new car sales 462 were selected, the user could be connected directly with the new car sales department as a required action.

A specific, exemplary form of the present method will now be illustrated with respect to the flowchart in FIG. 1. A user or customer calling a business, institution, or other establishment, for example, to place or check on an order or to speak with some specific person would enable their user telephone's display call path function (if required) and place the call, as indicated at block 500. If the establishment telephone which is called does not answer, as decided in block 502, a decision is made to hang up, block 504. If the establishment phone does answer, a decision is made, block 506, whether it is call-path-enabled. If not, the communication reverts to voice with DTMF response, block 508, as described above. If the establishment telephone is call-path-display-enabled, the establishment phone can send out a code, such as two DTMF tone pairs, which the user telephone will recognize as support for the call path display feature. This can be transmitted at reduced volume, as suggested by the mute speaker block 510. Upon receiving the code, the user telephone can return an acknowledgment and proceed to download the call-path data. It will appreciated that the foregoing discussion relates to a specific system wherein the user telephone selectively sends the call path interrogation signal. As discussed above, the user telephone could automatically send such a signal, or the signal could instead be sent by the establishment telephone.

An exemplary form of data downloading process will now be described. As indicated at block 512, the next menu item (which is the first item if no item has yet been downloaded) is "gotten" or downloaded. A check is made at block 514 whether the menu is complete. If the menu is not complete, a decision is made (in block 516) as to whether the user has selected an item. If not, a return is made to block 512 and the next menu item in the branch is downloaded. If the user has in fact selected an item, a decision is made in block 518 as to whether the selection requires action. As noted, during the downloading process, the visual input/output module 212, 212', 312 can keep the user (the caller) apprised of the progress of the download. Once the download is completed, the menu, or a portion thereof, can be displayed and the speaker and microphone 206, 206', 306 and 204, 204', 304, respectively, can be reenabled. As also noted above, the menu options can be displayed, one at a time, when they are downloaded and the user can then navigate through the menu, selecting options of interest.

Still with reference to FIG. 1, if it is determined in block 518 that an action is required, the action can then be taken in block 520 and, if necessary, the voice mode can be entered in block 522 with the detection of the on-hook condition in block 524 at the end of the call. Referring again to block 518, if the given selection does not require action, the next level in the menu can be accessed, as in block 526, and the process can be repeated for the next branch of the menu. For example, referring to FIG. 8, if service were selected, no action would be required and so one would move down one level, namely, to blocks 468 and 470 and repeat the above-described process.

Reference should now be had again to the decision block 514. If, when the next menu item in the branch is fetched at 512, the menu is complete (in this exemplary case), then the user must select an item per decision block 528. The fact that the menu is complete can be determined, for example, by receipt of a code word from the establishment. As indicated in FIG. 1, looping can continue until the user selects an item. Once the user has selected an item, the process moves to decision block 530 for a determination whether the selection requires action. If the selection does not require action, the relevant options can be displayed to the user, as indicated at block 532. Control is then returned to decision block 528 to determine whether an item has been selected. With reference to FIG. 8, once the menu is completed without the user making a selection, control would pass to block 528 until the user selected an item, at which point it would be determined, in block 530, whether the selection required action. In the event that block 454 was selected, no action would be required and in block 532, the next level of options, namely blocks 468 and 470, would be displayed. If action were required, the action could be taken in block 534. An example of this would be selection of block 456 in FIG. 8 which would be followed by a prompt to enter the number which it was desired to dial followed by the pound sign, in block 472. At that point, switch to voice mode could again be made per block 536 with checking for an on-hook condition conducted at decision block 538. It will be appreciated that since all of the menu (in this exemplary case) is present in the user telephone's memory 202, 202', 302, the user can scan both forwards and backwards to view the entire set of available options and then scroll back to the best fit before making a selection. Thus, compared to current voice-based systems, the user can access the desired option more quickly and more accurately, since they can have the whole gamut of available options before them.

In FIG. 1, it will be appreciated that blocks 528, 530, 532, 534, 536 and 538 are provided for the case when the menu has been downloaded but the user is unable to make up his or her mind. Looping can continue while awaiting a selection, or, in case of a hang-up, the whole procedure can be repeated from the beginning (i.e., Block 500).

Since with reference to FIG. 1, as well as FIGS. 7 and 8, some examples of actions that might be required by a selection from the user could be ringing the service department, followed by entering the voice mode and exiting the menu system, or, for example, typing a security code, followed by the establishment phone retrieving a file corresponding to the security code. Again, it should be emphasized that these actions are exemplary and many other actions could be programmed into the system. In the method described above, it will be appreciated that when an item is selected during downloading, the downloading immediately switches to the next lowest level items. This is done to minimize the time required for downloading the options which are of interest to the caller. For example, referring to FIG. 8, sales 452 and service 454 could be downloaded. Once service 454 was selected, schedule 468 and check status 470 could be downloaded and displayed. If neither 468 nor 470 where selected, downloading could continue with dial extensions 456, employment 458, and accounting 460.

Every branch of the tree could end in an action which would result in the PBX ringing an appropriate extension (of course, other actions such as taking of a message could be implemented). The level at which an action is finally reached may vary from item to item. With particular reference to FIG. 8, as discussed above, the numerals following the various entries could correspond to the numbers to be pressed in a conventional system. In the system of the present invention, selection could be made by pressing a special select key on the keypad or by pressing the appropriate numeral on the keypad, as in the prior-art non-display system. In one embodiment of method according to the present invention, arrow keys could permit the user to highlight a desired menu item and the pressing of the aforementioned select key could select the item. Alternatively, up and down arrow keys could be used to select a particular level and, as noted, a number could be pressed to select the particular option within that level of options. A number of other methods for selecting options from a displayed option tree, such as voice, handwriting recognition and the like are possible.

Still referring to FIG. 1, it should be noted that in one form of the invention, the decision block 514 refers to completion of downloading of the entire menu. The decision block 516 can permit selection of any item downloaded to date. The order of fetching menu items can be prioritized by the establishment, for example. For instance, with reference to block 512, the next menu item to be fetched could actually be in a higher level, if desired. This could be done, for example, if the user did not make a selection at a given lower level, in order to save time. Referring to block 520, it should be noted that action can be taken by both the user (for example, going to voice mode), and by the establishment (for example, ringing an appropriate extension). It should be understood that operation of the program within the user telephone, as depicted in FIG. 1, will normally be faster than the downloading process. Further, it should be understood that downloading can continue while the user "mulls over" their selection. Depending on display capacity, however, the next lower level may or may not be displayed. In some instances, it may be helpful for the user to see the "end result" before deciding which selection to make. It should be emphasized that the user can be given the ability to navigate up or down through the downloaded menu levels at any time.

Attention should now be directed to FIG. 9, which shows a pictorial representation of one form of enhanced function user telephone 300 in accordance with the present invention. The interface region 334, as noted above, can accept a flash memory card or other form of PCMCIA card. The keypad 208 can include the standard telephone numerals and the visual display 216 can be provided as shown. Visual display 216 can be configured to show at least three lines of text (e.g., blocks 452, 454 and 456 in FIG. 8 with scrolling to view blocks 458 and 460) or can be configured to show substantially an entire branch or the entire menu. Additional keys can include, for example, up and down arrow keys 336, 338 and a select key 340, as discussed above. Other keys 342, 344 could be provided in any desired quantity for any desired special purpose, such as activating a voice or handwriting input mode, jumping from one level to another, and the like. Connection can be made to a suitable telephone line 324 as discussed above.

While there have been described what are presently believed to be the preferred embodiments of the invention, those skilled in the art will realize that various changes and modifications may be made to the invention without departing from the spirit of the invention, and it is intended to claim all such changes and modifications as fall within the scope of the invention.

What is claimed is:

1. A call path display telephone system for operation over a telephone network, said call path display telephone system comprising:
    (a) an establishment telephone, said establishment telephone in turn comprising:
        (a-1) an establishment memory which stores quasi-permanent call path menu data providing a plurality of path options for a user of the system;
        (a-2) an establishment communication module which receives input signals over the telephone network and which sends call path menu data signals, indicative of said quasi-permanent call path menu data, in response thereto; and
        (a-3) an establishment controller which is coupled to said establishment memory and said establishment communication module and which controls operation thereof; and
    (b) a user telephone, said user telephone in turn comprising:
        (b-1) a user memory which stores downloaded call path menu data;
        (b-2) a microphone which receives voice input from the user;
        (b-3) a speaker which provides audible output to the user;
        (b-4) a keypad which receives alphanumeric input from the user;
        (b-5) a user communication module which receives said call path menu data signals from said establishment communication module and which provides said call path menu data signals to said user memory in a form for storage as said downloaded call path menu data;
        (b-6) a visual input/output module which visually displays said downloaded call path menu data to the user and which receives interactive input from the user in response to the visually displayed call path menu data; and
        (b-7) a user controller which is coupled to said user memory, said microphone, said speaker, said keypad, said user communication module and said visual input-output module and which controls operations thereof; wherein said establishment communication module and said user communication module are configured to communicate the call path menu data signals over the telephone network via DTMF signaling.

2. The system of claim 1, wherein said user communication module and said user controller are configured to emit a call path display interrogation signal which interrogates said establishment telephone to determine whether said establishment telephone is a call-path-display-enabled unit.

3. The system of claim 2, wherein said user controller and at least one of said keypad and said visual input/output module are configured to selectively enable and disable emission of said call path display interrogation signal.

4. The system of claim 1, wherein said establishment communication module and said establishment controller are configured to emit a call path display interrogation signal which interrogates said user telephone to determine whether said user telephone is a call-path-display-enabled unit.

5. The system of claim 1, further comprising a mute controller which is interconnected with said user speaker and which selectively mutes said user speaker during reception of said call path menu data signals.

6. The system of claim 1, wherein said user controller is configured to purge said user memory of said downloaded call path menu data following completion of a given telephone call.

7. The system of claim 1, wherein said visual input/output module comprises:
    a visual display which is coupled to said user controller and which visually displays said downloaded call path menu data to the user; and
    a cursor controller which is coupled to said user controller and which receives said interactive input from the user by permitting the user to place a cursor on and to select a desired call path menu option and to scroll through said call path menu data.

8. The system of claim 7, wherein said visual display is configured to display at least three lines of textual call path menu data.

9. The system of claim 7, wherein said visual display is configured to selectively display substantially all of said call path menu data to provide the user with a substantially complete call path menu.

10. The system of claim 1, wherein:
    said user communication module comprises:
        a user dual-tone multifrequency (DTMF) generator/detector coupled to said user controller; and a user data access arrangement (DAA) which is coupled to said user DTMF generator/detector and which is configured for communication over the telephone network; and said establishment communication module comprises:
an establishment dual-tone multifrequency generator/detector (DTMF) coupled to said establishment controller; and
an establishment data access arrangement (DAA) which is coupled to said establishment DTMF generator/detector and which is configured for communication over the telephone network.

11. The system of claim 10, wherein said establishment memory, said establishment controller, said user memory and said user controller are configured to recognize a set of predefined menu characters corresponding to standard call path options.

12. The system of claim 10, wherein said establishment controller is configured to operate in a voice plus DTMF response mode when said user telephone has not been identified as a call-path-display-enabled unit.

13. A call path display telephone system for operation over a telephone network, said call path display telephone system comprising:
(a) an establishment telephone, said establishment telephone in turn comprising:
(a-1) an establishment memory which stores quasi-permanent call path menu data providing a plurality of path options for a user of the system;
(a-2) an establishment communication module which receives input signals over the telephone network and which sends call path menu data signals, indicative of said quasi-permanent call path menu data, in response thereto; and
(a-3) an establishment controller which is coupled to said establishment memory and said establishment communication module and which controls operation thereof; and
(b) a user telephone, said user telephone in turn comprising:
(b-1) a user memory which stores downloaded call path menu data;
(b-2) a microphone which receives voice input from the user;
(b-3) a speaker which provides audible output to the user;
(b-4) a keypad which receives alphanumeric input from the user;
(b-5) a user communication module which receives said call path menu data signals from said establishment communication module and which provides said call path menu data signals to said user memory in a form for storage as said downloaded call path menu data;
(b-6) a visual input/output module which visually displays said downloaded call path menu data to the user and which receives interactive input from the user in response to the visually displayed call path menu data; and
(b-7) a user controller which is coupled to said user memory, said microphone, said speaker, said keypad, said user communication module and said visual input/output module and which controls operations thereof; wherein:
said user communication module comprises a user modem and a user data access arrangement which is coupled to said user modem and which is configured for communication over the telephone network; and said visual input/output module comprises:
a visual display which is coupled to said user controller and which visually displays said downloaded call path menu data to the user; and
a digitizer which is coupled to said user controller and which receives said interactive input from the user, at least in part via handwriting capture.

14. A user telephone for use in a call path display telephone system which operates over a telephone network, said user telephone comprising:
(a) a user memory which stores downloaded call path menu data;
(b) a microphone which receives voice input from a user;
(c) a speaker which provides audible output to the user;
(d) a keypad which receives alphanumeric input from the user;
(e) a user communication module which receives call path menu data signals over the telephone network, via DTMF signaling, and which provides said call path menu data signals to said user memory in a form for storage as said downloaded call path menu data;
(f) a visual input/output module which visually- displays said downloaded call path menu data to the user and which receives interactive input from the user in response to the visually displayed call path menu data; and
(g) a user controller which is coupled to said user memory, said microphone, said speaker, said keypad, said user communication module and said visual input/output module and which controls operation thereof.

15. The user telephone of claim 14, wherein said user communication module and said user controller are configured to emit a call path display interrogation signal which interrogates an establishment telephone to determine whether the establishment telephone is a call-path-display-enabled unit.

16. The user telephone of claim 15, wherein said user controller and at least one of said keypad and said visual input/output module are configured to selectively enable and disable emission of said call path display interrogation signal.

17. The user telephone of claim 14, wherein said user telephone is adapted to interact with an establishment telephone of the call path display telephone system, and wherein said user telephone is configured to receive a call path display interrogation signal from an establishment communication module and an establishment controller of the establishment telephone, the call path display interrogation signal having a purpose, the purpose of the call path display interrogation signal being to determine whether said user telephone is a call-path-display-enabled unit.

18. The user telephone of claim 14, further comprising a mute controller which is interconnected with said user speaker and which selectively mutes said user speaker during reception of said call path menu data signals.

19. The user telephone of claim 14, wherein said user controller is configured to purge said user memory of said downloaded call path menu data following completion of a given telephone call.

20. The user telephone of claim 14, wherein said visual input/output module comprises:
a visual display which is coupled to said user controller and which visually displays said downloaded call path menu data to the user; and
a cursor controller which is coupled to said user controller and which receives said interactive input from the user by permitting the user to place a cursor on and to select a desired call path menu option and to scroll through said call path menu data.

21. The user telephone of claim 20, wherein said visual display is configured to display at leas three lines of textual call path menu data.

22. The user telephone of claim 20, wherein said visual display is configured to selectively display substantially all of said call path menu data to provide the user with a substantially complete call path menu.

23. The user telephone of claim 14, wherein said user communication module comprises:
   a user dual-tone multifrequency (DTMF) generator/detector coupled to said user controller; and
   a user data access arrangement (DAA) which is coupled to said user DTMF generator/detector and which is configured for communication over the telephone network.

24. The user telephone of claim 23, wherein said user memory and said user controller are configured to recognize a set of predefined menu characters corresponding to standard call path options.

25. The user telephone of claim 23, wherein said user controller is configured to operate in a voice plus DTMF response mode when a corresponding establishment telephone of the call path display telephone system has not been identified as a call-path-display-enabled unit.

26. A user telephone for use in a call path display telephone system which operates over a telephone network, said user telephone comprising:
   (a) a user memory which stores downloaded call path menu data;
   (b) a microphone which receives voice input from a user;
   (c) a speaker which provides audible output to the user;
   (d) a keypad which receives alphanumeric input from the user;
   (e) a user communication module which receives call path menu data signals over the telephone network and which provides said call path menu data signals to said user memory in a form for storage as said downloaded call path menu data;
   (f) a visual input/output module which visually displays said downloaded call path menu data to the user and which receives interactive input from the user in response to the visually displayed call path menu data; and
   (g) a user controller which is coupled to said user memory, said microphone, said speaker, said keypad, said user communication module and said visual input/output module and which controls operation thereof; wherein:
   said user communication module comprises a user modem and a user data access arrangement which is coupled to said user modem and which is configured for communication over the telephone network; and
   said visual input/output module comprises:
      a visual display which is coupled to said user controller and which visually displays said downloaded call path menu data to the user; and
      a digitizer which is coupled to said user controller and which receives said interactive input from the user, at least in part via handwriting capture.

27. A method of communicating call path menu data from an establishment to a user, said method comprising the steps of:
   (a) placing of a telephone call, from a user telephone of the user, to an establishment telephone of the establishment;
   (b) downloading the call path menu data from said establishment telephone into a user memory of said user telephone, in response to said telephone call;
   (c) visually displaying the call path menu data to the user; and
   (d) accepting, by the establishment, from the user, in response to said visual display of the call path menu data, a selection of a given call path menu item from the call path menu data;
   wherein step (b) comprises downloading the call path menu data from said establishment telephone into said memory of said user telephone, in response to said telephone call, via DTMF tones.

28. The method of claim 27, further comprising the additional step of selectively enabling the user telephone to emit a call path display interrogation signal to verify call path display status of the establishment telephone.

29. The method of claim 27, further comprising the additional step of purging the downloaded call path menu data from said user memory after completion of the call.

30. The method of claim 27, wherein:
   step (b) comprises downloading enough of the call path menu data such that the downloaded call path menu data in said user memory corresponds to a substantially complete call path menu; and
   step (c) comprises displaying said substantially complete call path menu to the user.

31. The method of claim 30, wherein step (c) comprises displaying substantially all portions of said substantially complete call path menu to the user substantially simultaneously.

32. The method of claim 30, wherein step (c) comprises selectively displaying portions of said substantially complete call path menu to the user in response to interaction with the user.

33. The method of claim 27, wherein the call path menu data includes a plurality of menu items, further comprising the additional step of displaying each one of said items to the user as it is downloaded in step (b).

34. The method of claim 27, wherein step (c) comprises displaying top-level items of said call path menu data and is performed only after step (b) is complete so as to advise the user of completion of step (b).

35. The method of claim 34, further comprising the additional step of advising the user regarding progress of step (b).

36. The method of claim 27, wherein step (c) comprises downloading only a first level of the call path menu data, further comprising the additional step of downloading a second level of call path menu data subsequent to step (d), in response to said selection of said given call path item.

37. The method of claim 27, wherein step (d) comprises having the user scroll through the call path menu data, to make said selection, with a cursor controller.

38. The method of claim 27, wherein step (c) comprises displaying the call path menu data as at least three lines of textual data.

39. The method of claim 27, wherein:
   the call path menu data is representative of a call path menu having a plurality of branches and a plurality of levels, each of said branches and each of said levels having at least one call path menu item, a first one of said branches corresponding to a top one of said levels, additional ones of said branches corresponding to at least one menu item at a given one of said levels, other than said top one of said levels, which correlates to a menu item at a next highest one of said levels; and step (b) comprises sequentially downloading individual ones of said menu items in a given one of said branches until one of completion of said downloading of said given one of said branches; and selection of said given call path in step (d);

further comprising the additional steps of:
(e) determining whether said selection of said given call path item requires action;
(f) taking said action if said action is required;
(g) displaying options associated with said selection if said downloading is complete; and
(h) repeating steps (b)–(g) for another given one of said branches which correlates to said call path menu item selected in step (d).

40. The method of claim 27, further comprising the additional step of supporting spoken interaction between the user and the establishment, in response to said accepting of selection.

41. The method of claim 27, further comprising the additional step of emitting a call path display interrogation signal from said user telephone so as to verify that said establishment telephone is call-path-display-enabled.

42. The method of claim 27, further comprising the additional step of emitting a call path display interrogation signal from said establishment telephone so as to verify that said user telephone is call-path-display-enabled.

43. The method of claim 27, further comprising the additional step of:
muting a speaker of said user telephone during sending of said DTMF tones.

44. The system of claim 13, wherein said user telephone further comprises:

an audio processor; and an interface region for receipt of at least one of:
a flash memory; and
a PCMCIA-format card;

and wherein:
said audio processor is coupled to said user controller, said speaker and said microphone and is configured for at least one of speech synthesis output through said speaker and speech recognition input through said microphone; and
said interface region is coupled to said user controller.

45. The user telephone of claim 26, wherein said user telephone further comprises:

an audio processor; and an interface region for receipt of at least one of:
a flash memory; and
a PCMCIA-format card;

and wherein:
said audio processor is coupled to said user controller, said speaker and said microphone and is configured for at least one of speech synthesis output through said speaker and speech recognition input through said microphone; and
said interface region is coupled to said user controller.

46. The method of claim 27, wherein step (d) comprises accepting from the user, in response to said visual display of the call path menu data, said selection of said given call path item from the call path menu data, vai DTMF tones.

* * * * *